May 14, 1946.  C. J. CAVALLITO  2,400,389
FILM CONTAINING IODINE
Filed March 26, 1942
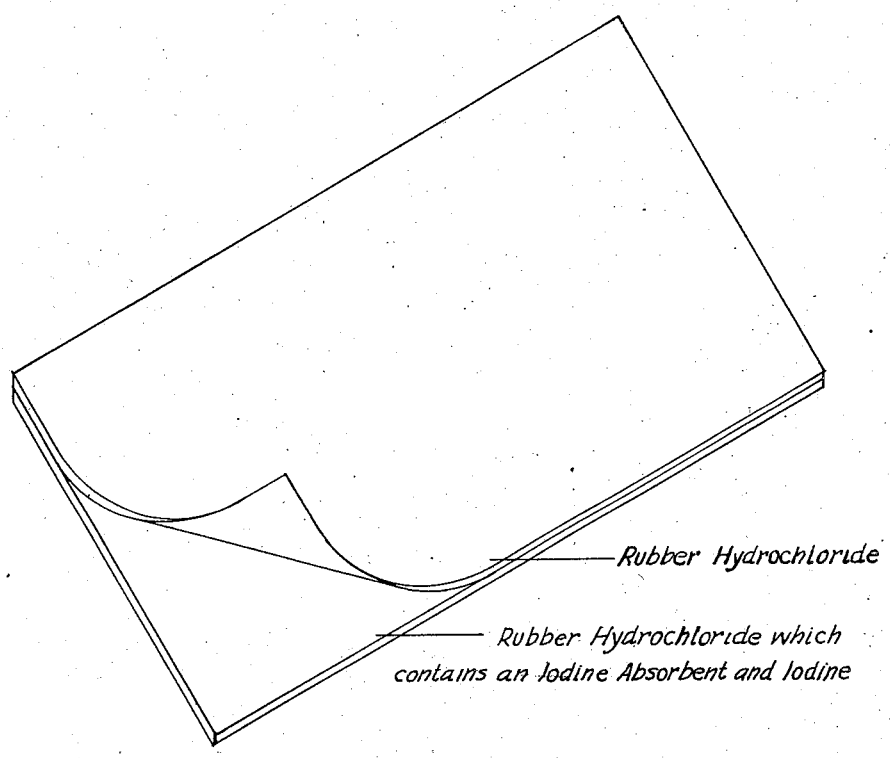
Rubber Hydrochloride
Rubber Hydrochloride which contains an Iodine Absorbent and Iodine
INVENTOR
Chester J. Cavallito
BY
R. H. Waters
ATTORNEY Patented May 14, 1946

2,400,389

UNITED STATES PATENT OFFICE 2,400,389

FILM CONTAINING IODINE

Chester J. Cavallito, Rensselaer, N. Y., assignor to Wingfoot Corporation, Akron, Ohio, a corporation of Delaware Application March 26, 1942, Serial No. 436,324

5 Claims. (Cl. 154—46)

This invention relates to a rubber hydrochloride film which contains iodine and liberates the iodine gradually. The film is designed for wrapping surgical gauze, etc. for wet dressings, and may even be used for iodine therapy.

Rubber hydrochloride does not absorb iodine, at least to the extent necessary to make it feasible to use it as a source of iodine. However, rubber hydrochloride which has been elasticized (plasticized) with an elasticizer (plasticizer) such as butyl stearate or dibutyl sebacate absorbs iodine quite readily from a water solution. A film of elasticized rubber hydrochloride which has absorbed iodine will subsequently gradually liberate the iodine. If the film is a laminated sheet composed of one ply of unelasticized film and one ply of suitably elasticized film, the elasticized side of the sheet will absorb the iodine, and, of course, it will only be liberated from this side. Such a laminated sheet is ideal for wrapping instruments, surgical gauze and other materials which are to be kept sterile. The unelasticized side of the sheet is used on the outside of the package. This prevents loss of iodine to the atmosphere. The iodine liberated from the inner surface of the sheet serves in keeping the instruments, etc. sterile.

The film may contain any suitable material which absorbs, adsorbs or dissolves iodine. Such a material is herein called an "iodine carrier." It may be a material which has no other effect on the film than to dissolve the iodine. The invention, therefore, includes the use of any material which absorbs, adsorbs or dissolves iodine. It includes the use of butyl stearate, dibutyl sebacate and other elasticizers which take up the iodine, such as esters of other fatty acids, such as butyl laurate and esters of dicarboxylic acids, such as dibutyl phthalate. Other materials which may be used for taking up the iodine include ethyl methoxy phthalate, butoxy ethyl phthalate, etc.

The laminated sheet of this invention may, for example, comprise a ply of unelasticized rubber hydrochloride film (such as the material commercially known as Pliofilm NO) about .001 of an inch thick and a ply of rubber hydrochloride film which contains anywhere from five per cent of butyl stearate up to ten per cent or more, such as the material commercially known as Pliofilm N-2. These two plies of film may be laminated by pressing them together while heating them to a temperature at which they coalesce.

The elasticized side of this laminated sheet is then exposed to an aqueous bath of iodine and potassium iodide; for example, a water solution containing ten per cent of iodine and ten per cent of potassium iodide. This is most conveniently done by passing the laminated sheet through such a bath. The elasticized side of the film is allowed to remain exposed to the iodine for a sufficient time, for example, one to ten minutes depending upon the iodine content desired. The greater the elasticizer content of the film, the more rapid the absorption of the iodine.

In such a laminated sheet the elasticized side will contain the iodine and will be exposed to the materials or articles, etc. which are to be treated with the iodine. The unelasticized side of the laminated sheet will act as a barrier preventing loss of the iodine to the atmosphere.

The drawing shows in perspective a laminated sheet of the type here described, one surface of which contains iodine and the other surface of which contains no iodine and serves as a barrier to the release of iodine from this side of the sheet.

Although the invention has been described more particularly as applied to a laminated sheet, a non-laminated elasticized sheet may be treated in a similar manner to absorb iodine.

What I claim is:

1. A sheet of rubber hydrochloride film which contains an iodine carrier and iodine.

2. A sheet of rubber hydrochloride film elasticized with butyl stearate and containing iodine.

3. A laminated sheet of rubber hydrochloride film, one ply of which is rubber hydrochloride and contains no iodine and the other of which is rubber hydrochloride which contains an iodine carrier and contains iodine in a condition in which it is readily liberated.

4. A laminated sheet of rubber hydrochloride film, one ply of which is unelasticized rubber hydrochloride and the other ply of which is rubber hydrochloride elasticized with a material which is a solvent for iodine and contains dissolved iodine.

5. A package, the enclosing element of which is a rubber hydrochloride film the outer surface of which is free of iodine and the inner surface of which comprises an iodine carrier and iodine.

CHESTER J. CAVALLITO.